(12) United States Patent
Zhang et al.

(10) Patent No.: US 7,734,089 B2
(45) Date of Patent: Jun. 8, 2010

(54) METHOD FOR REDUCING MOSQUITO NOISE

(75) Inventors: Jun Zhang, San Jose, CA (US); Chun-Wei Chen, Taipei (TW); Jiande Jiang, San Jose, CA (US); Zheng Liu, Sunnyvale, CA (US)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 660 days.

(21) Appl. No.: 11/210,296

(22) Filed: Aug. 23, 2005

(65) Prior Publication Data

US 2007/0053608 A1  Mar. 8, 2007

(51) Int. Cl.
*G06K 9/00* (2006.01)

(52) U.S. Cl. .................. 382/181; 345/611; 358/3.03

(58) Field of Classification Search ......... 382/168–172, 382/254–275, 100, 181, 190, 191, 194, 195, 382/224, 225; 345/589, 611, 616; 358/3.03, 358/3.04, 3.05

See application file for complete search history.

(56) References Cited

U.S. PATENT DOCUMENTS

| | | | | |
|---|---|---|---|---|
| 4,339,745 A | * | 7/1982 | Barber et al. | 382/172 |
| 4,941,190 A | * | 7/1990 | Joyce | 382/264 |
| 5,247,358 A | | 9/1993 | Richards | |
| 5,781,658 A | * | 7/1998 | O'Gorman | 382/172 |
| 6,057,935 A | * | 5/2000 | Freeman | 358/1.9 |
| 6,195,467 B1 | * | 2/2001 | Asimopoulos et al. | 382/261 |
| 6,563,964 B1 | * | 5/2003 | Hallberg | 382/299 |
| 6,621,595 B1 | * | 9/2003 | Fan et al. | 358/3.26 |
| 7,171,036 B1 | * | 1/2007 | Liu et al. | 382/145 |
| 7,262,884 B2 | * | 8/2007 | Kawakami | 358/2.1 |
| 7,301,672 B2 | * | 11/2007 | Abe et al. | 358/1.9 |
| 2004/0037473 A1 | * | 2/2004 | Ahmed et al. | 382/254 |
| 2004/0070677 A1 | * | 4/2004 | Adams et al. | 348/222.1 |
| 2004/0196408 A1 | * | 10/2004 | Ishikawa et al. | 348/616 |
| 2004/0207882 A1 | * | 10/2004 | Ahmed et al. | 358/3.26 |
| 2005/0089194 A1 | * | 4/2005 | Bell | 382/103 |
| 2005/0180648 A1 | | 8/2005 | Curry et al. | |
| 2005/0201620 A1 | * | 9/2005 | Kanamoto et al. | 382/182 |
| 2005/0213845 A1 | * | 9/2005 | Avinash et al. | 382/275 |
| 2006/0269131 A1 | * | 11/2006 | Metcalfe et al. | 382/176 |
| 2008/0018755 A1 | * | 1/2008 | Chen et al. | 348/241 |

OTHER PUBLICATIONS

Gonzalez, Digital Image Processing, Nov 2001, Prentice Hall, 2 edition, pp. 117, 120, 128, 129, 231, 584.*
PCT Search Report and Written Opinion corresponding to the related PCT Patent Application No. US 06/32421 dated Sep. 14, 2007.

* cited by examiner

*Primary Examiner*—Anand Bhatnagar
(74) *Attorney, Agent, or Firm*—DLA Piper LLP (US)

(57) ABSTRACT

A method of reducing mosquito noise in a digital image. As mosquito noise is often most plainly visible in the "background" of an image (e.g., the sky or some other backdrop to objects within an image), the luminance value of the background of the image is first determined. Then, the luminances of the pixels of the image are compared against this "background luminance" to determine which should be considered as part of this background. The luminances of these background pixels are then averaged so as to smooth out the representation of the background, and reduce mosquito noise.

20 Claims, 4 Drawing Sheets

METHOD FOR REDUCING MOSQUITO NOISE

BRIEF DESCRIPTION OF THE INVENTION

The present invention relates generally to digital image compression. More specifically, the present invention relates to a method for reducing mosquito noise in MPEG-compressed images.

BACKGROUND OF THE INVENTION

Image compression is often performed in order to reduce the size of digital image files. However, the various compression techniques often have associated drawbacks. For example, images compressed according to various MPEG formats are known to suffer from "mosquito noise," or the blurring of the outlines of objects within these images. Named for its resemblance to the look of mosquitoes flying about the objects of the images, mosquito noise detracts from the visual effect of an MPEG-compressed picture. Accordingly, continuing efforts exist to reduce the appearance and effect of mosquito noise in compressed images.

SUMMARY OF THE INVENTION

The invention can be implemented in numerous ways, including as a method and a computer readable medium. Several embodiments of the invention are discussed below.

As a method of reducing mosquito noise in an image having pixels and a representation of a background, one embodiment of the invention comprises determining a luminance value corresponding to the background. Luminance values of the pixels are compared to the luminance value corresponding to the background, so as to determine a set of background pixels. The pixels of the set of background pixels are assigned average luminance values determined according to luminance values of the pixels adjacent to said each pixel.

As a computer readable medium having computer-executable instructions for performing a method for reducing mosquito noise in an image having pixels and a representation of a background, another embodiment of the invention comprises a first set of instructions for determining a luminance value corresponding to the background. A second set of instructions compares luminance values of the pixels to the luminance value corresponding to the background, so as to determine a set of background pixels. A third set of instructions assigns, to pixels of the set of background pixels, average luminance values determined according to luminance values of the pixels adjacent to said each pixel.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention, together with further objects and advantages thereof, may best be understood by reference to the following description taken in conjunction with the accompanying drawings in which.

Like reference numerals refer to corresponding parts throughout the drawings. Also, it is understood that the depictions in the figures are diagrammatic and not necessarily to scale.

DETAILED DESCRIPTION OF EMBODIMENTS OF THE INVENTION

In one embodiment of the invention, a method of reducing mosquito noise in a digital image is described. As mosquito noise is often most plainly visible in the "background" of an image (e.g., the sky or some other backdrop to objects within an image), the luminance value of the background of the image is first determined. Then, the luminances of the pixels of the image are compared against this "background luminance" to determine which should be considered as part of this background. The luminances of these background pixels are then averaged so as to smooth out the representation of the background, and reduce mosquito noise.

Figure 1:
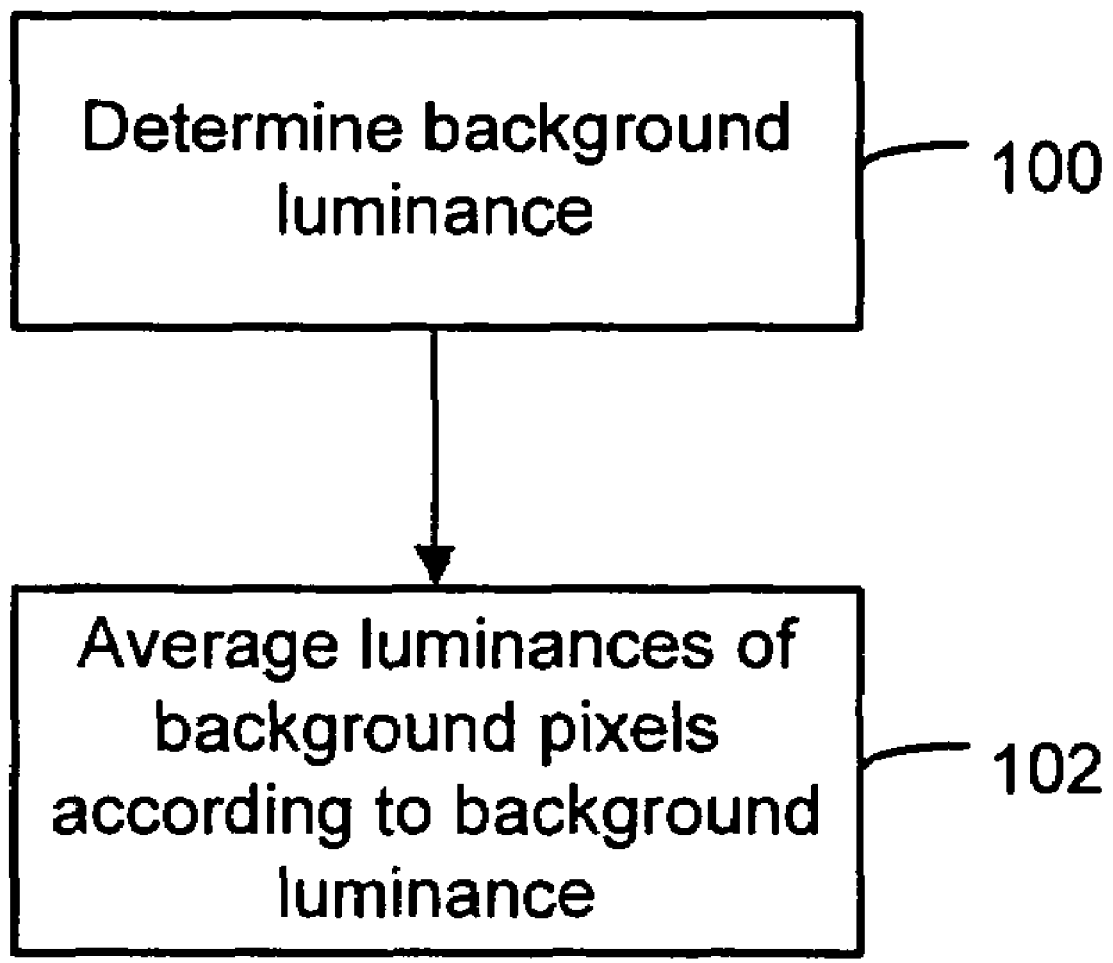
FIG. 1 illustrates process steps for reducing mosquito noise according to an embodiment of the invention.

FIG. 1 illustrates high-level process steps for reducing mosquito noise according to an embodiment of the invention. While the following discussion relates to a method, it should be appreciated that the blocks or steps illustrated in FIG. 1 (as well as the other Figures) may represent circuitry, modules or devices used to perform the method. For example, conventional hardware, software and/or firmware may be used to perform the steps and/or processes discussed herein. It should further be appreciated that such logic steps or processes can be implemented as computer-executable instructions stored on a computer readable medium.

First, a background luminance is determined, corresponding to a luminance value for the background as a whole (step 100). Then, the pixels making up this background are identified and their luminances are averaged (step 102). This averaging yields increased uniformity among background pixels, smoothing out differences between these pixels and therefore reducing the effect of mosquito noise.

Figure 2:
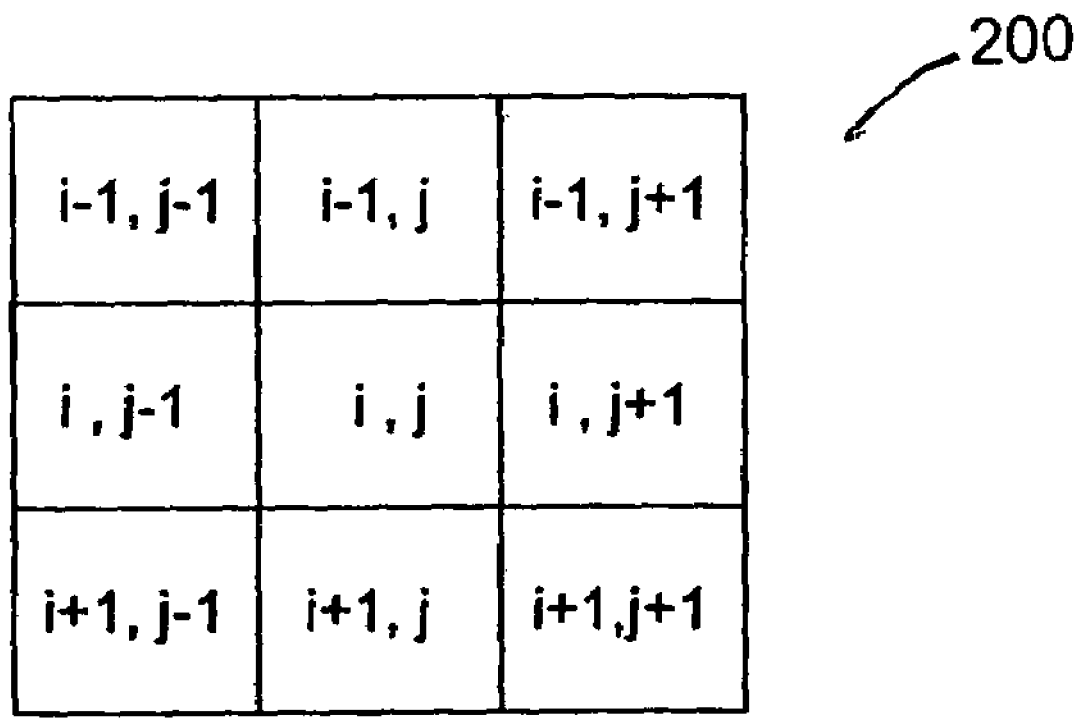
FIG. 2 conceptually illustrates an image pixel and its adjacent pixels.

In one embodiment, the determination of a background luminance, and the averaging of background pixel luminances, are accomplished with reference to a selected pixel and its eight immediately adjacent pixels, as shown in FIG. 2. Here, a grid 200 is shown that illustrates a particular pixel (i,j) and its surrounding pixels. This pixel configuration and its associated nomenclature are used below in explaining methods of the invention.

Figure 3:
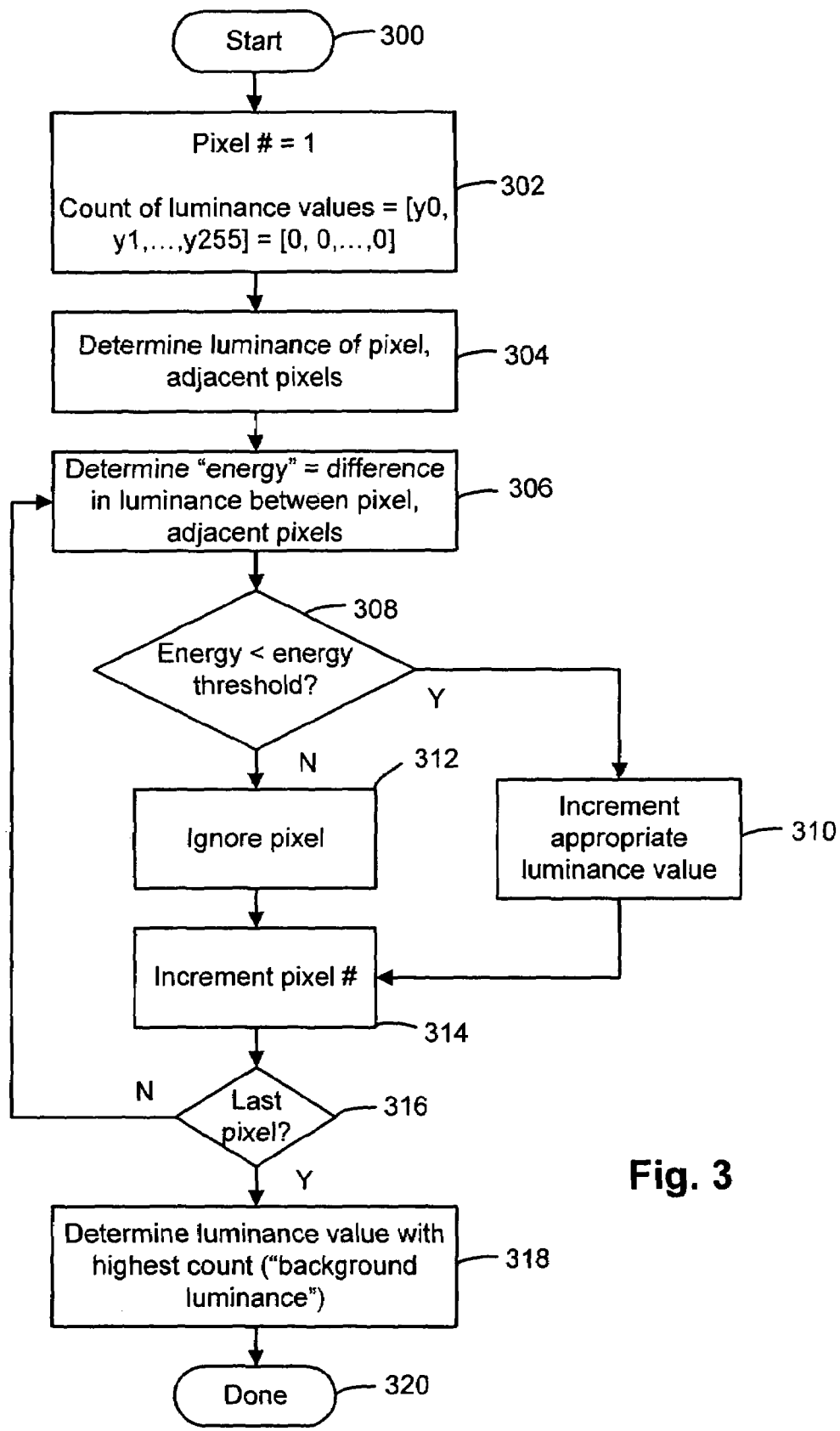
FIG. 3 illustrates process steps for determining a background luminance according to an embodiment of the invention.

FIG. 3 illustrates step 10, the identification of a background luminance, in more detail. In one embodiment, a histogram of all known luminance values (0-255) is kept. According to methods of the invention, the luminances of certain pixels are added to the histogram, while other pixels are ignored. When all or a representative number of pixels are analyzed, the numerically largest histogram value (corresponding to the most frequently encountered luminance value of the non-ignored pixels) is deemed as the background luminance.

Accordingly, the process of FIG. 3 begins (step 300) by setting each histogram value to zero (step 302). In embodiments utilizing an array to represent this histogram, each element of the array can be set to zero. A pixel count can also be kept, and if so this value is set to 1. A first pixel (i,j) of the image is then chosen, and the luminances of that pixel and each adjacent pixel are determined according to (step 304).

Typically, luminance values Y(i,j) for each pixel are already known and simply need to be retrieved, as they are one component of the data making up the image to be analyzed.

Next, the "energy" (i,j), or sum of the differences between the luminance of the chosen pixel (i,j) and the luminances of each adjacent pixel, is determined (step 306):

$$\text{Energy}(i, j) = \frac{\sum_{m=i-1}^{i+1} \sum_{n=j-1}^{j+1} |Y(m, n) - Y(i, j)|}{8} \quad (2)$$

where:

i=0, 1, . . . , M−1; j=0, 1, . . . , N−1;

M=height of the picture in pixels; and

N=width of the picture in pixels.

The energy of each pixel (i,j) is then compared to an energy threshold value (step 308). If the energy of this pixel is less than the energy threshold value, the appropriate luminance value of the histogram is incremented (step 310). That is, if pixel (i,j) has a luminance value of 150, and its corresponding energy is less than the energy threshold value, the histogram value corresponding to 150 is incremented by 1. On the other hand, if the energy of this pixel is greater than the energy threshold value, the pixel is ignored and no value of the histogram is incremented (step 312). In some embodiments, an energy threshold value of 15 has been found to be effective, although one of skill will realize that the invention encompasses the use of any energy threshold value that assists in identifying background luminances. The process then moves on to the next pixel, i.e., increments the pixel count by 1 (step 314). If pixels remain (step 316), the process returns to step 306, whereas if no pixels remain, the histogram is examined to determine the largest of its values, which corresponds to the luminance value shared by the greatest number of pixels of the image (step 318). This luminance value is identified as the background luminance, at which point the process terminates (step 320).

One of ordinary skill in the art will observe that this "energy" quantity is an approximate measure of how closely the luminance of a particular pixel matches with the luminances of its surrounding pixels. That is, the energy of a pixel will be relatively low if surrounding pixels have similar luminance values, and high if surrounding pixels differ greatly in luminance. Pixels with relatively low energy will thus be similar in luminance to their surroundings. As the background of an image is typically more uniform in color and intensity than the remainder of the image, these low-energy pixels are deemed more likely to be part of the background. Accordingly, a histogram of low-energy pixels is an effective way to keep track of those pixels that make up the background of an image, with the luminance value corresponding to the greatest number of pixels being most likely to be a good measure of the luminance of the image's background.

Figure 4:
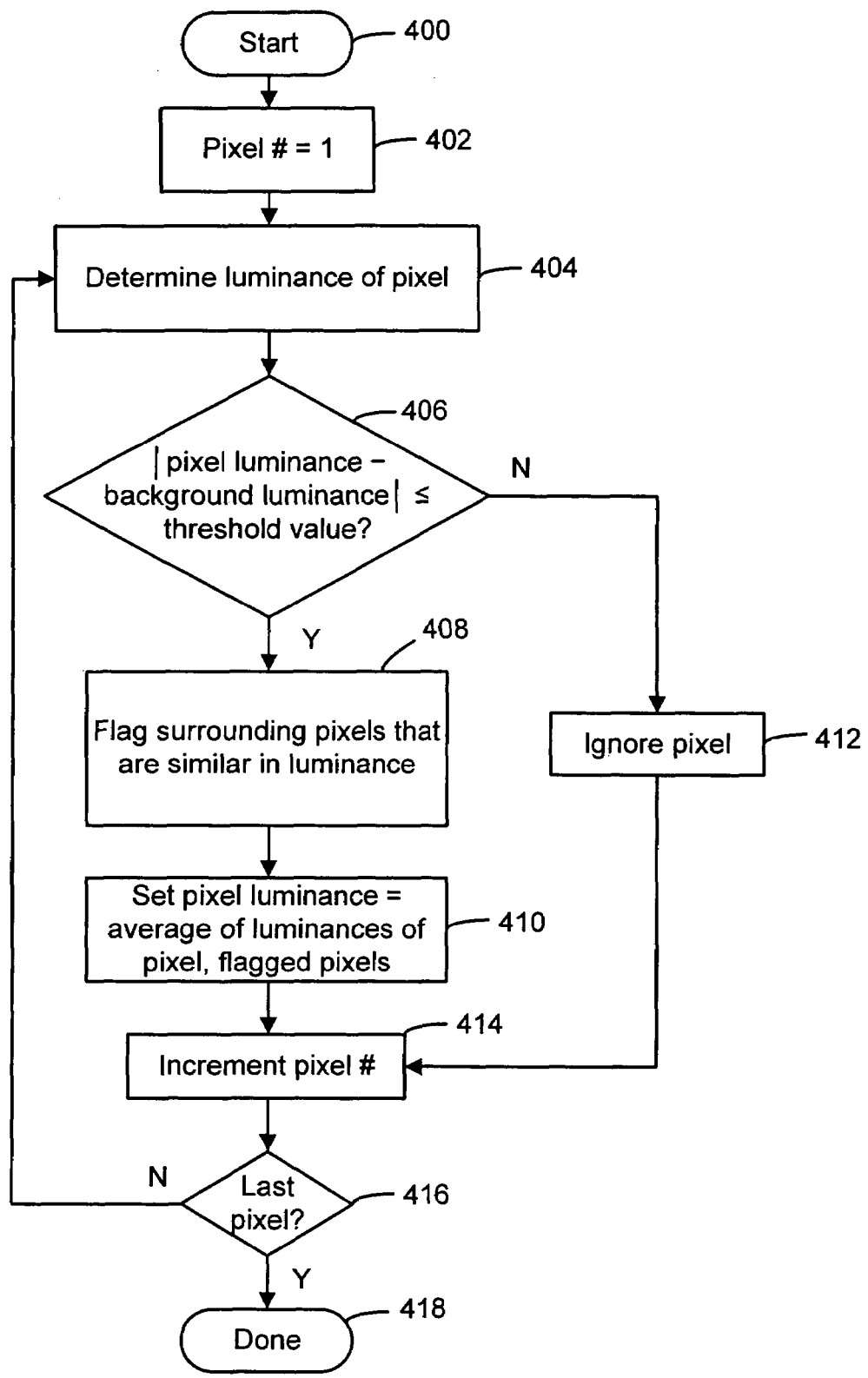
FIG. 4 illustrates process steps for reducing mosquito noise by averaging luminances of background pixels according to an identified background luminance.

Once this background luminance is identified, it can be used to identify those pixels that correspond to the background, and smooth out their luminance values so as to reduce the effect of mosquito noise. FIG. 4 illustrates step 20, the identification and smoothing of background pixels once the background luminance is known, in further detail. The process of FIG. 4 begins (step 400) with setting a count of pixel numbers to 1 (step 402), so as to keep track of the pixels processed. The luminance of this first pixel is determined or simply retrieved (step 404), and is compared to the previously-identified background luminance (step 406). If the difference between these two luminance values is less than a threshold value, i.e., if the pixel's luminance is sufficiently similar to that of the background, then this pixel's luminance is averaged according to its surrounding pixels. More specifically, the surrounding pixels are flagged if they are sufficiently similar to the first pixel (step 408):

$$\text{flag}(m, n) = \begin{cases} 0, & \text{if } |Y(i, j) - Y(m, n)| \geq \text{FlagThreshold} \\ 1, & \text{if } |Y(i, j) - Y(m, n)| \leq \text{FlagThreshold} \end{cases} \quad (3)$$

and:

$$\text{Count}(i, j) = \sum_{m=i-1}^{i+1} \sum_{n=j-1}^{j+1} \text{flag}(m, n) \quad (4)$$

where:

m=i−1, i, i+1; n=j−1, j, j+1; and i=0, 1, . . . , M−1; j=0, 1, . . . , N−1.

Thus, surrounding pixels are flagged with a "1" if their luminance values are within a threshold amount FlagThreshold of the luminance of pixel (i,j). In some embodiments, a flag threshold value of 10 has been found to be effective, although one of ordinary skill in the art will realize that the invention encompasses the use of any flag threshold value that assists in correctly flagging pixels.

The pixel's luminance is then set equal to the average of the luminances of that pixel, as well as the flagged pixels (step 410), which has the effect of smoothing out variances in the luminances of those pixels belonging to the background, thus reducing mosquito noise effects:

$$Y'(i, j) = \frac{\sum_{m=i-1}^{i+1} \sum_{n=j-1}^{j+1} \text{flag}(m, n) \times Y(m, n)}{\text{Count}(i, j)} \quad \text{if} \quad (5)$$

$$|Y(i, j) - Y(\text{background})| \leq \text{BackgroundThreshold}. \quad (6)$$

On the other hand, if the difference between the luminance value of this pixel and the background luminance is larger than the BackgroundThreshold value of equation (6), the pixel is deemed as not belonging to the background, and its luminance remains unchanged (step 412). In some embodiments, a background threshold value of 10 has been found to be effective, although one of skill will realize that the invention encompasses the use of any energy threshold value that assists in identifying background luminances.

In either case, the pixel number is then incremented (step 414) and a check is performed to determine whether any pixels remain (step 416). If pixels remain, the process returns to step 304, and continues. If not, the process terminates (step 418).

It should be noted that aspects of the invention include the determination of a luminance value corresponding to the background of an image, as well as the identification and averaging/smoothing of pixels in that background. While the above description illustrates certain methods for carrying out these aspects, it is not an exhaustive list of such methods. Thus, while the background luminance is identified according to an "energy" metric identifying pixels that are similar to their surrounding pixels, the invention need not be limited to this case. For instance, the use of different energy threshold values can be employed. Similarly, different criteria besides energy can be employed, such as visual and/or automatic identification of a background. Also, while background pixels are smoothed according to an average of similar surrounding pixels, the invention need not be so limited. For example, the invention can utilize various BackgroundThreshold values. It also need not employ a simple numerical average, but can instead smooth pixels according to their neighboring pixels in any known fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, various values of the energy threshold, flag threshold, and background threshold can be employed. Also, background luminances can be identified in a number of ways, including by an energy metric, other metrics, visually, and/or by any other known method of automatic identification of particular regions of a digital image. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of reducing mosquito noise in an image having pixels and a representation of a background, comprising:
   determining a representative luminance value corresponding to the background, wherein the representative luminance value is a function of a comparison between a luminance value of a selected pixel in the image with a set of adjacent luminance values corresponding to luminance values of pixels that are proximate to the selected pixel;
   comparing luminance values of the pixels to the representative luminance value corresponding to the background, so as to determine a set of background pixels; and
   assigning to pixels of the set of background pixels average luminance values determined according to luminance values of adjacent pixels.

2. The method of claim 1 wherein determining a representative luminance value corresponding to the background further comprises:
   (A) receiving the luminance value of the selected pixel;
   (B) determining the adjacent luminance values corresponding to luminance values of pixels that are proximate to the selected pixel;
   (C) calculating a difference value according to differences between the luminance value of the selected pixel and the adjacent luminance values;
   (D) comparing the difference value to a difference value threshold;
   (E) if the difference value exceeds the difference value threshold, incrementing an element of an array of luminance values, the element corresponding to the luminance value of the selected pixel; and
   (F) selecting the luminance value corresponding to the numerically largest element of the elements, so as to select the luminance value corresponding to the background.

3. The method of claim 2 further comprising, prior to (F), repeating (A), (B), (C), (D), and (L) for each of the pixels.

4. The method of claim 2 wherein (C) further comprises setting the difference value equal to an average of the differences between the luminance value of the selected pixel and the adjacent luminance values.

5. The method of claim 2 wherein the difference value threshold is about 15.

6. The method of claim 5 wherein the assigning further comprises leaving the luminance value of the selected pixel unchanged when the difference threshold value does not exceed the luminance difference corresponding to the difference between the luminance value of the selected pixel and the representative luminance value corresponding to the background.

7. The method of claim 1:
   wherein the comparing further comprises computing luminance differences between the luminance values of the pixels and the representative luminance value corresponding to the background, and comparing the luminance differences to a first luminance difference threshold; and
   wherein the assigning further comprises assigning the average luminance values when the first luminance difference threshold exceeds the luminance differences.

8. The method of claim 7 wherein the first luminance difference threshold is about 10.

9. The method of claim 7 wherein the assigning further comprises:
   (A) determining the luminance values of the selected pixel and of the pixels adjacent to the selected pixel;
   (B) flagging those pixels of the pixels adjacent to the selected pixel that have luminance values that are different from the luminance value of the selected pixel by an amount less than a second luminance difference threshold; and
   (C) setting the luminance value of the selected pixel substantially equal to the average of the luminance values of the flagged pixels.

10. The method of claim 9 wherein the second luminance difference threshold is about 10.

11. A computer readable medium encoded with computer-executable instructions for performing a method for reducing mosquito noise in an image having pixels and a representation of a background, the method comprising:
    a first set of instructions for determining a representative luminance value corresponding to the background, wherein the representative luminance value is a function of a comparison between a luminance value of a selected pixel in the image with a set of adjacent luminance values corresponding to luminance values of pixels that are proximate to the selected pixel;
    a second set of instructions for comparing representative luminance values of the pixels to the luminance value corresponding to the background, so as to determine a set of background pixels; and
    a third set of instructions for assigning to pixels of the set of background pixels average luminance values determined according to luminance values of adjacent pixels.

12. The computer readable medium of claim 11 wherein the first set of instructions further comprises instructions for:

(A) determining the luminance value of the selected pixel;
(B) determining the adjacent luminance values corresponding to luminance values of pixels that are proximate to the selected pixel;
(C) calculating a difference value according to differences between the luminance value of the selected pixel and the adjacent luminance values;
(D) comparing the difference value to a difference value threshold;
(E) if the difference value exceeds the difference value threshold, incrementing an element of an array of luminance values, the element corresponding to the luminance value of the selected pixel; and
(F) selecting the luminance value corresponding to the numerically largest element of the elements, so as to select the luminance value corresponding to the background.

13. The computer readable medium of claim 12 wherein the first set of instructions further comprises, prior to (F), repeating (A), (B), (C), (D), and (E) for each of the pixels.

14. The computer readable medium of claim 12 wherein (C) further comprises instructions for setting the difference value equal to an average of the differences between the luminance value of the selected pixel and the adjacent luminance values.

15. The computer readable medium of claim 12 wherein the difference value threshold is about 15.

16. The computer readable medium of claim 15 wherein the third set of instructions further comprises instructions for leaving the luminance value of the selected pixel unchanged when the difference threshold value does not exceed the luminance difference corresponding to the difference between the luminance value of the selected pixel and the representative luminance value corresponding to the background.

17. The computer readable medium of claim 11:
wherein the second set of instructions further comprises instructions for computing luminance differences between the luminance values of the pixels and the representative luminance value corresponding to the background, and comparing the luminance differences to a first luminance difference threshold; and
wherein the third set of instructions further comprises instructions for assigning the average luminance values when the first luminance difference threshold exceeds the luminance differences.

18. The computer readable medium of claim 17 wherein the first luminance difference threshold is about 10.

19. The computer readable medium of claim 17 wherein the third set of instructions further comprises instructions for:
(A) determining the luminance values of the selected pixel and of the pixels adjacent to the selected pixel;
(B) flagging those pixels of the pixels adjacent to the selected pixel that have luminance values that are different from the luminance value of the selected pixel by an amount less than a second luminance difference threshold; and
(C) setting the luminance value of the selected pixel substantially equal to the average of the luminance values of the flagged pixels.

20. The computer readable medium of claim 19 wherein the second luminance difference threshold is about 10.

* * * * *